UNITED STATES PATENT OFFICE.

CARL DUISBERG, OF ELBERFELD, PRUSSIA, GERMANY, ASSIGNOR TO FAR-BENFABRIKEN, VORMALS FR. BAYER & CO., OF SAME PLACE.

MANUFACTURE OF DYE-STUFFS OR COLORING-MATTERS.

SPECIFICATION forming part of Letters Patent No. 366,078, dated July 5, 1887.

Application filed August 22, 1885. Serial No. 175,102. (No specimens.)

*To all whom it may concern:*

Be it known that I, CARL DUISBERG, a subject of the Emperor of Germany, and residing at Elberfeld, in the Kingdom of Prussia and Empire of Germany, have invented a new and useful Improvement in the Manufacture of Dye-Stuffs or Coloring-Matters, of which the following is a specification.

My invention relates to the production of a new blue azo color—the first blue dye-stuff of this kind for dyeing on cotton, wool, and silk—by the action of tetrazo-ditolyl upon that monosulpho-acid of the alpha-naphthol which is obtained by sulphonizing alpha-naphthol or by the decomposition of the alpha-diazo-naphthylamine sulpho-acid (diazotized naphthionic acid) by boiling.

In carrying out my process practically I proceed as follows: Ten (10) kilos ortho or para tolidin sulphate (described in the reports of the Deutsche Chemische Gesellschaft at Berlin, XVII annual, 1884, pages 467 and 472, by G. Schultz) are suspended in a finely-comminuted condition in one hundred and fifty liters water. To this add fifteen kilos of muriatic acid of the specific gravity of 1.161, and when this solution is cooled by ice add gradually 4.4 kilos sodium nitrite dissolved in water. In this way a reddish-yellow solution of tetrazo-ditolyl chloride is formed. The thus-obtained solution is thereupon allowed to pass slowly into a solution of seventeen kilos alpha-naphthol alpha-monosulpho-acid of natron (obtained by sulphonizing of the alpha-naphthol or by the decomposition of diazotized naphthionic acid) and ten kilos soda to four hundred liters of water. A dark-blue precipitate is formed, which is more fully deposited by the addition of common salt. After a short rest, filter and dry. In this way the sodium salt of an oxyazo combination of the following composition is formed:

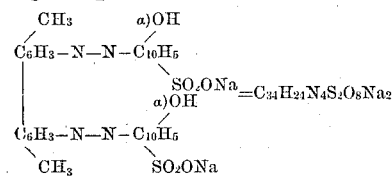

This forms in the dry state a black amorphous powder difficult to dissolve in cold water, but very easy to dissolve in hot water, giving a reddish-violet color, and on adding mineral acids to the concentrated watery solution it forms into a reddish-violet amorphous precipitation. It dissolves in an alcoholic and concentrated acetic-acid solution with difficulty into a wine-red color. It is not soluble in concentrated soda-lye. It, however, easily dissolves by diluted soda-lye or by ammonia of twenty per cent. into a deep-red color; by concentrated sulphuric acid into a deep indigo-blue color. It dyes unmordanted cotton in a boiling bath containing alkali, and develops best with phosphate of soda ($Na_2HPO_4$) or with silicate of soda into a deep reddish blue, is fast to soap, and possesses the property of being fast to mineral acids.

What I claim as my invention, and desire to secure by Letters Patent, is—

The new coloring-matter herein described, having the properties hereinbefore specified, resulting from the action of tetrazo-ditolyl upon the alpha-naphthol alpha-monosulpho-acid.

In testimony whereof I have signed my name to this specification in the presence of two subscribing witnesses.

CARL DUISBERG.

Witnesses:
HERM. MATTHIS,
RICHARD LEKEBUSCH.